(12) United States Patent
Chai et al.

(10) Patent No.: US 9,428,411 B2
(45) Date of Patent: Aug. 30, 2016

(54) REACTOR FOR SEWAGE TREATMENT

(71) Applicant: Chongqing University, Chongqing (CN)

(72) Inventors: Hongxiang Chai, Chongqing (CN); Wei Kang, Chongqing (CN); Wei Chen, Chongqing (CN); Nanping Al, Chongqing (CN); Chuanrong Su, Chongqing (CN); Zhiwen Wei, Chongqing (CN); Qiang He, Chongqing (CN); Xuebin Hu, Chongqing (CN); Junhua Fang, Chongqing (CN); Wentao Yan, Chongqing (CN)

(73) Assignee: CHONGQING UNIVERSITY, Chongqing (CN)

( * ) Notice: Subject to any disclaimer, the term of this patent is extended or adjusted under 35 U.S.C. 154(b) by 13 days.

(21) Appl. No.: 14/183,495

(22) Filed: Feb. 18, 2014

(65) Prior Publication Data

US 2014/0262999 A1 Sep. 18, 2014

(30) Foreign Application Priority Data

Mar. 15, 2013 (CN) .......................... 2013 1 0082916

(51) Int. Cl.
| | |
|---|---|
| *C02F 3/06* | (2006.01) |
| *C02F 3/12* | (2006.01) |
| *C02F 3/30* | (2006.01) |
| *C02F 3/32* | (2006.01) |

(52) U.S. Cl.
CPC ................ *C02F 3/06* (2013.01); *C02F 3/121* (2013.01); *C02F 3/1247* (2013.01); *C02F 3/301* (2013.01); *C02F 3/302* (2013.01); *C02F 3/327* (2013.01); *C02F 3/308* (2013.01); *Y02W 10/15* (2015.05); *Y02W 10/18* (2015.05)

(58) Field of Classification Search
CPC ........ C02F 3/06; C02F 3/121; C02F 3/1247; C02F 3/301; C02F 3/302; C02F 3/327; C02F 3/308
See application file for complete search history.

(56) References Cited

U.S. PATENT DOCUMENTS

| | | | |
|---|---|---|---|
| 7,674,378 B2 * | 3/2010 | Kent ............................. | 210/602 |
| 2003/0024874 A1 * | 2/2003 | Wallace et al. ............... | 210/602 |
| 2010/0059438 A1 * | 3/2010 | Bottcher ................ | C02F 1/004 |
| | | | 210/610 |

OTHER PUBLICATIONS

Yu et al., "Machine Translation of CN101987761", 10 total pages.*
Zhai et al., "Machine Translation of CN102153253", 13 total pages.*

* cited by examiner

*Primary Examiner* — Bobby Ramdhanie
*Assistant Examiner* — Jonathan Peo
(74) *Attorney, Agent, or Firm* — Matthias Scholl, PC; Matthias Scholl

(57) ABSTRACT

A reactor for sewage treatment includes: an inner layer including a water distribution zone; a middle layer including a biological aerated filter, the biological aerated filter including a wall and a bottom including a water outlet; and an outer layer including an artificial wetland, the artificial wetland including a bottom including a water inlet. The water distribution zone, the biological aerated filter, and the artificial wetland are in the shape of a circle. The sewage is introduced into the water distribution zone via a water inlet pipe. The water distribution zone communicates with the biological aerated filter via a first overflow. The water outlet arranged on the bottom of the biological aerated filter is connected to the water inlet arranged on the bottom of the artificial wetland to allow the biological aerated filter to communicate with the artificial wetland.

10 Claims, 4 Drawing Sheets

REACTOR FOR SEWAGE TREATMENT

CROSS-REFERENCE TO RELATED APPLICATIONS

Pursuant to 35 U.S.C. §119 and the Paris Convention Treaty, this application claims the benefit of Chinese Patent Application No. 201310082916.1 filed Mar. 15, 2013, the contents of which are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to the field of sewage treatment and environment protection, and more particularly to a reactor for low-carbon treatment of sewage.

2. Description of the Related Art

Biological aerated filter (BAF) is a new technology for sewage treatment using biofilm. BAF integrates the biological oxidation and retention of suspended solid as a whole to save the space of the subsequent sedimentation tank, and is characterized in the high volume load, high hydraulic load, short hydraulic retention time, good quality of effluent, and low energy consumption. However, after a period of operation, the interception of the pollutants in the filter layer and the growing of the biofilm easily cause the obstruction of the filter layer, so that the biological aerated filter is required to backwash, which results in waste of a large volume of the water for backwashing and a large head loss.

Artificial wetland is a comprehensive ecological system, it employs principles including species symbiosis and matters recycling in the ecological system and is based on the premise of facilitating the virtuous cycling of the pollutants to fully take advantage of the production potential of the resource, whereby preventing the environment from being further polluted and acquiring a best result of the sewage treatment and sewage utilization as a resource. The artificial wetland functioning as a sewage treatment system is advantageous in its stable quality of the effluent, simple procedure, and low cost in infrastructure and operation, but the system also has problems, such as the effect of removal of nitrogen and phosphorus is not good and the efficiency thereof decreases during winter.

Purpose of the low-carbon treatment of sewage is to control the discharge of greenhouse gases including nitrous oxide. It is indicated from the research results that a high concentration of dissolved oxygen (>0.5 mg/L) in the nitrification, the elimination of dissolved oxygen, and a large COD/N value (>3.5), a relative large SRT value (>10 d), and a proper pH value (between 6.8 and 8) in the denitrification are conducive to the reduction of the production of the nitrous oxide.

SUMMARY OF THE INVENTION

In view of the above-described problems, it is one objective of the invention to provide a reactor for sewage treatment using a combination of a biological aerated filter and an artificial wetland. The reactor of the invention reduces the discharge of the greenhouse gases including nitrous oxide, prevents the filter layer of the biological aerated filter from being obstructed, simplifies the washing process of the biological aerated filter, and has a good effect of sewage treatment.

To achieve the above objective, in accordance with one embodiment of the invention, there is provided a reactor for sewage treatment. The reactor comprises: an inner layer comprising a water distribution zone; a middle layer comprising a biological aerated filter, the biological aerated filer comprising a wall and a bottom comprising a water outlet; and an outer layer comprising an artificial wetland, the artificial wetland comprising a bottom comprising a water inlet. The water distribution zone, the biological aerated filter, and the artificial wetland are in the shape of a circle. The sewage is introduced into the water distribution zone via a water inlet pipe. The water distribution zone communicates with the biological aerated filter via a first overflow. The water outlet arranged on the bottom of the biological aerated filer is connected to the water inlet arranged on the bottom of the artificial wetland to allow the biological aerated filter to communicate with the artificial wetland. The water outlet of the artificial wetland is connected to a water outlet pipe.

The biological aerated filter is formed by two layers of circular corridors and is provided with a filler frame and an aerator. Anoxic zones and aerobic zones are alternated in the two layers of circular corridors. The filler frames are arranged with a distance between one another, and a gap is disposed between each filler frame and the wall of the biological aerated filter.

The artificial wetland is formed by successively connecting an anoxic zone, a natural reoxygenation zone, and an aerobic zone. Isolation walls are disposed on two sides of the natural reoxygenation zone, and on each top of the isolation wall a second overflow is disposed for allowing water to pass through. The aerobic zone of a former section communicates with the anoxic zone of a latter section via a water drainage hole arranged on a bottom of the isolation wall.

The aerobic zone and the anoxic zone in the outer layer of the artificial wetland and the inner layer of the biological aerated filter are alternated. The sewage is introduced to every zone for treatment, so that a carbon source required by the nitration and denitrification is ensured, and the denitrification efficiency of the reactor is improved.

The aerobic zone of the biological aerated filter is provided with aeration pipes for ensuring a high content of dissolved oxygen in the nitration process as well as eliminating the dissolved oxygen as much as possible in the denitrification process, and thus, the activity of the nitrous oxide reductase is ensured, the reduction of the nitrous oxide into nitrogen is facilitated, and the production of the nitrous oxide is reduced. Plants in the artificial wetland are capable of absorbing carbon dioxide in the air, further lowering the discharge of the greenhouse gas. Furthermore, the filter layer is prevented from being obstructed due to the distance between the filler frames and the gap between the filler frame and the wall of the biological aerated filter. When backwashing the biological aerated filter, the aeration pipes in the anoxic zone and the aerobic zone are started simultaneously, thereby being easy to wash pollutants attached on the filler. The combination of the biological aerated filter and the artificial wetland employed results in a good effect of sewage treatment. Advantages of the invention are as follows: 1. The denitriding effect is good, and the production of the greenhouse gas of nitrous oxide is reduced; 2. The obstruction of the filter layer of the biological aerated filter is avoided, thereby being easy to wash the biological aerated filter; 3. The effect of sewage treatment is good.

BRIEF DESCRIPTION OF THE DRAWINGS

The invention is described herein below with reference to the accompanying drawings, in which.

Figure 1:
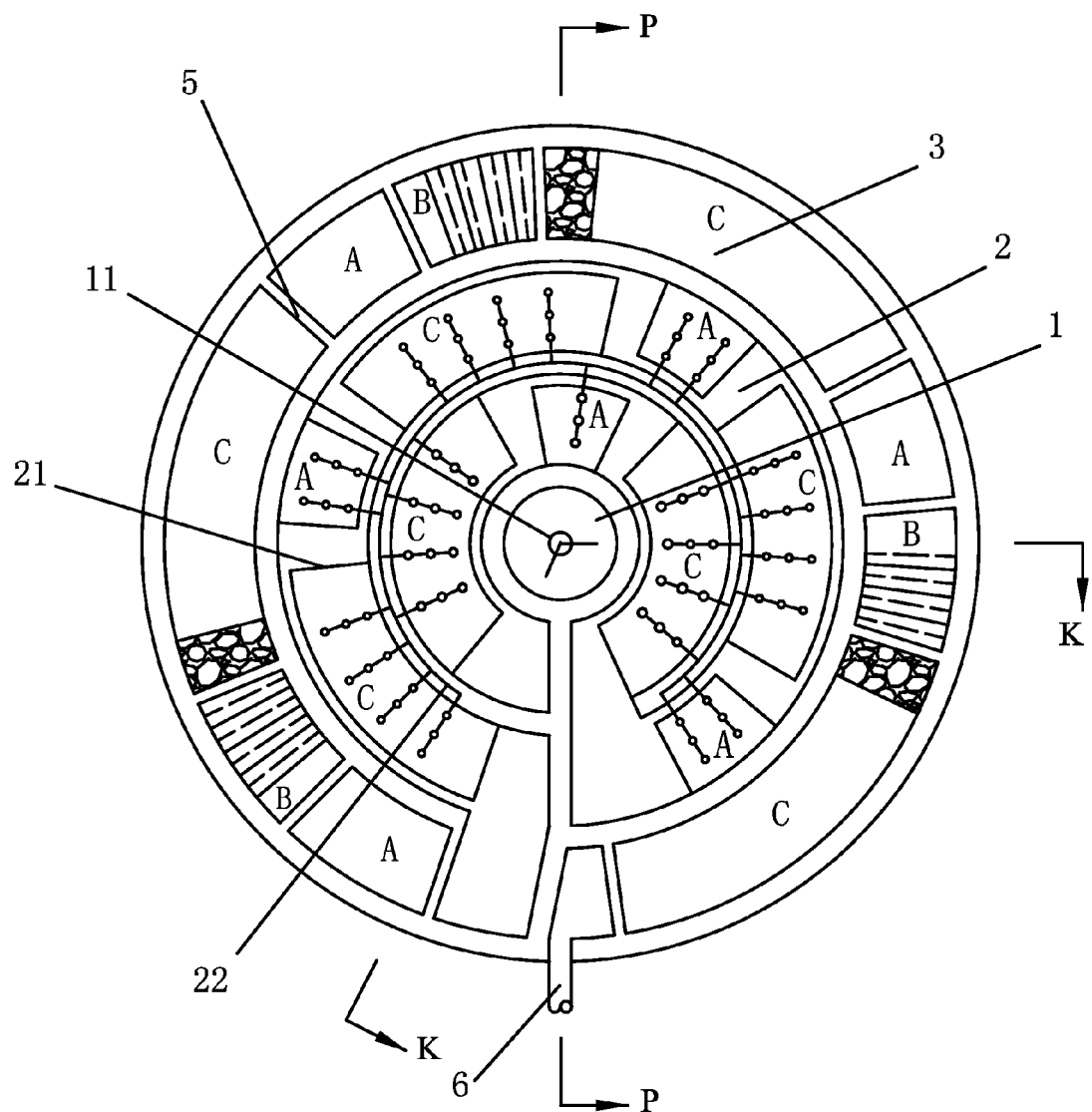
FIG. 1 is a plan view of reactor for sewage treatment in accordance with one embodiment of the invention.

In the drawings, the following reference numbers are used: 1. Water distribution zone; 11. Water inlet pipe; 12. First overflow; 2. Biological aerated filter; 21. Filler frame; 22. Aeration pipes; 23. Gap; 3. Artificial wetland; 31. Water plant; 32. Overburden; 33. Filler layer; 34. Water inlet; 35. Second over flow; 36. Water outlet; 4. Wall of biological aerated filter; 5. Isolation wall; and 6. Water outlet pipe.

DETAILED DESCRIPTION OF THE EMBODIMENTS

For further illustrating the invention, experiments detailing a reactor for sewage treatment using a combination of a biological aerated filter and an artificial wetland are described below. It should be noted that the following examples are intended to describe and not to limit the invention.

As shown in FIGS. 1-4, a reactor for sewage treatment using a combination of a biological aerated filter and an artificial wetland comprises: an inner layer comprising a water distribution zone 1; a middle layer comprising a biological aerated filter 2; and an outer layer comprising an artificial wetland 3. The water distribution zone 1, the biological aerated filter 2, and the artificial wetland 3 are in the shape of circle. Sewage is introduced into the water distribution zone 1 via a water inlet pipe 11. The water distribution zone 1 communicates with the biological aerated filter 2 via a first overflow 12. A water outlet arranged on a bottom of the biological aerated filter 2 is connected to a water inlet 34 arranged on a bottom of the artificial wetland 3 to allow the biological aerated filter 2 to communicate with the artificial wetland 3. A water outlet of the artificial wetland is connected to a water outlet pipe 6.

The biological aerated filter 2 is formed by two layers of circular corridors and is provided with a filler frame 21 and an aerator. Anoxic zones A and aerobic zones C are alternated in the two layers of circular corridors. The filler frames 21 are arranged with a distance between one another, and a gap 23 is disposed between each filler frame 21 and a wall of the biological aerated filter 2.

The artificial wetland 3 comprises an anoxic zone A, a natural reoxygenation zone B and an aerobic zone C being connected successively. A top of each isolation wall disposed on two sides of the natural reoxygenation zone B comprises a second overflow 35 for allowing the water to pass through. The aerobic zone C of a front section communicates with the anoxic zone A of a consequent section via a water drainage hole 36 arranged on a bottom of the isolation wall 5.

Figure 2:
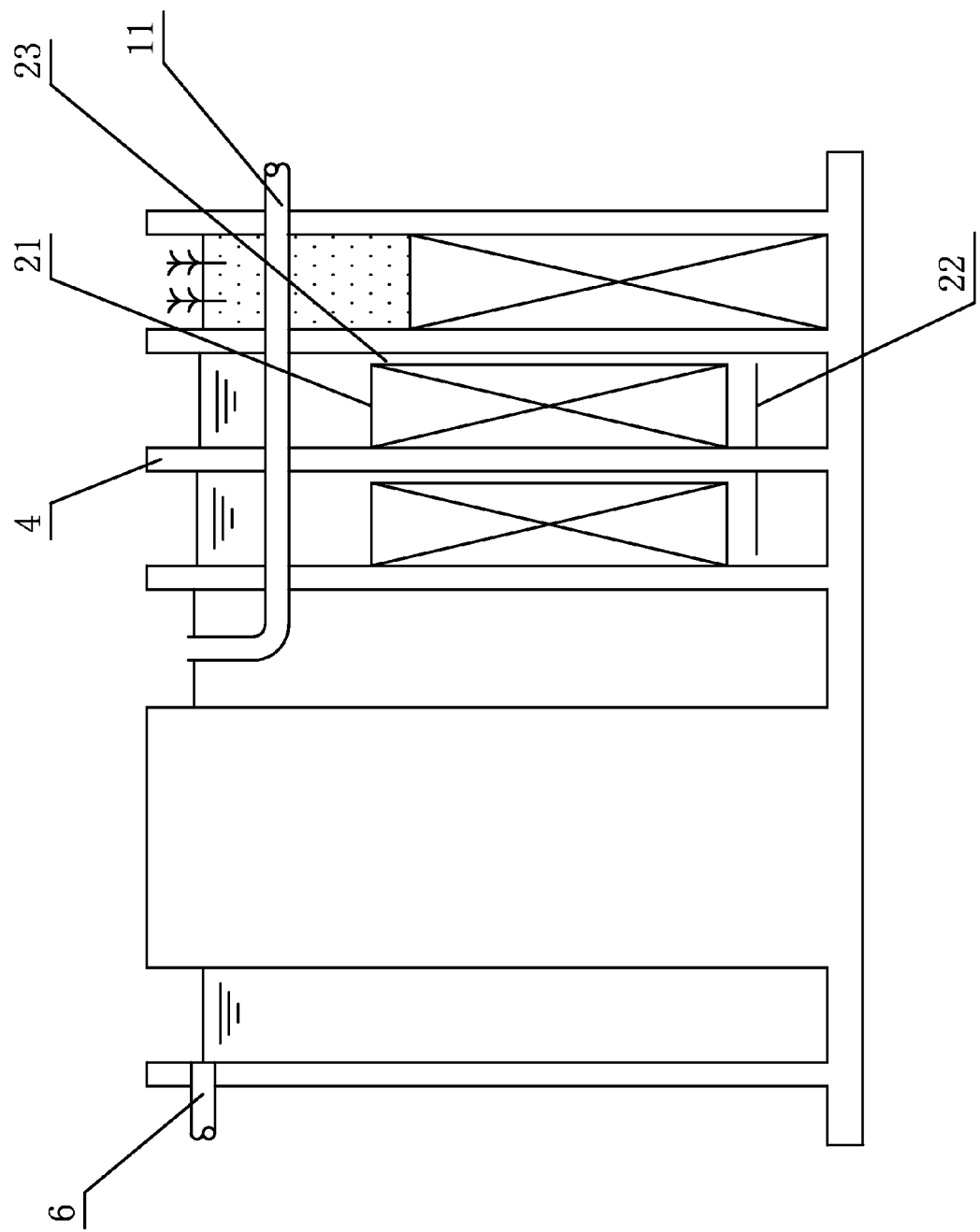
FIG. 2 is a cross-sectional view taken from line P-P of FIG. 1.
Figure 3:
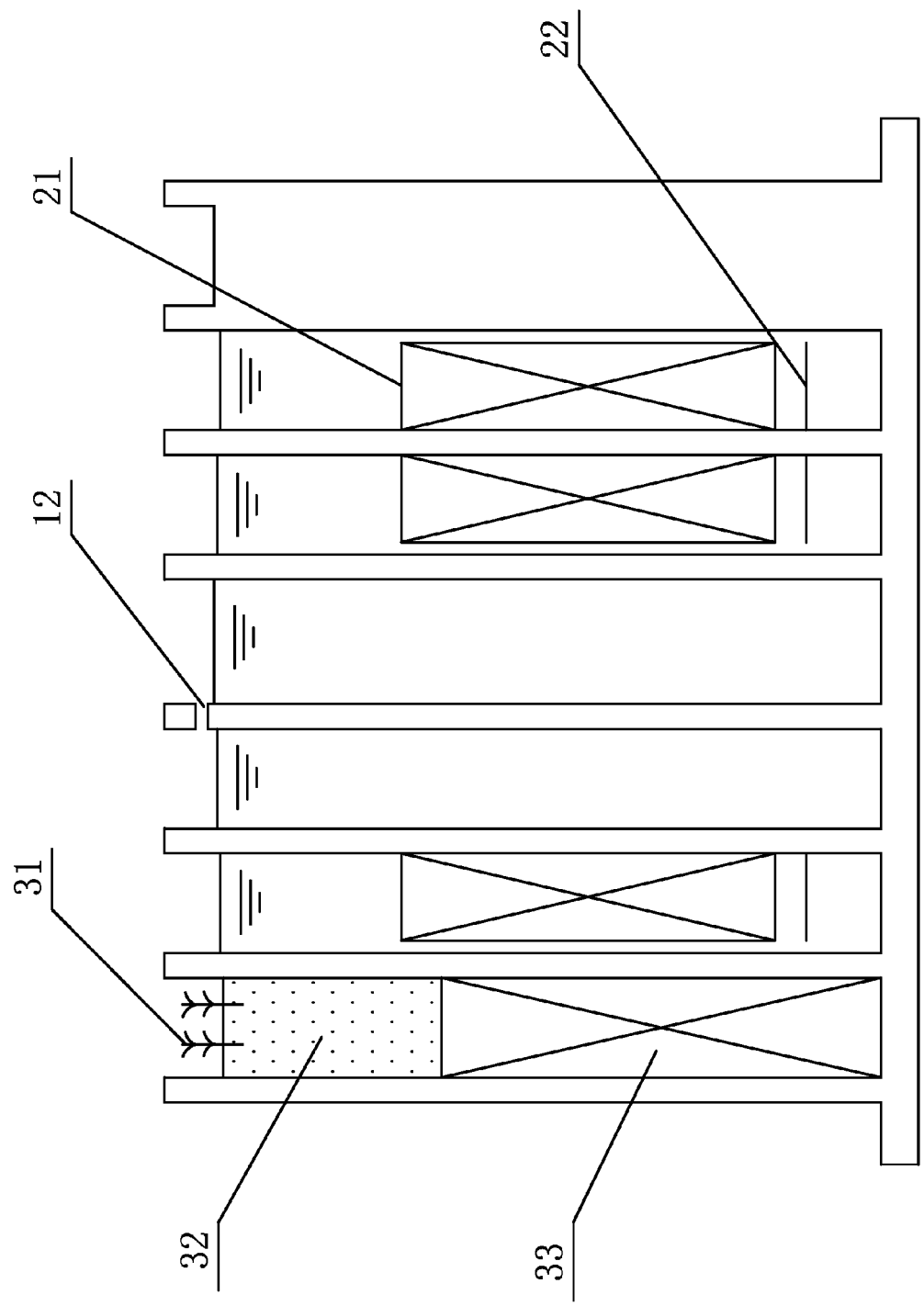
FIG. 3 is a cross-sectional view taken from part K-K of FIG. 1.

As shown in FIGS. 1-3, a first overflow 12 is disposed on an upper end of a wall of the water distribution zone 1 at a position of the section line K. The sewage enters to a first water tank arranged on a front end of the biological aerated filter 2 via the first overflow 12, penetrates into a first layer of circular corridor, passes through a first aerobic zone C, the anoxic zone, and a second aerobic zone C arranged on a rear end of the first layer of circular corridor, and then enters a common tank of the two layers of circular corridors. Thereafter, the sewage enters the second layer of circular corridor from the common tank. A second water tank is arranged on a rear end of the second layer of circular corridor and extends to the artificial wetland 3 arranged on the outer layer of the reactor. A water pipe arranged on a bottom of the second water tank is connected to the water inlet 34 arranged on the bottom of the artificial wetland 3. The sewage finally enters the outer layer of the reactor to be treated in the artificial wetland.

As shown in 1, the aerobic zone C of the biological aerated filter 2 is provided with aeration pipes 22. Aeration pipes 22 arranged on the middle part is more than aeration pipes 22 arranged on two sides of the aerobic zone C, such arrangement decrease the influence of the aeration on the anoxic zone A. A low concentration of the dissolved oxygen in the two sides of the anoxic zone facilitates the denitrification and decrease the production of the greenhouse gas of $N_2O$. To strengthen the effect of phosphorus removal, the filler frame 21 is filled with porous iron-rich filler. The aerated pipes 22 arranged on the anoxic zone A are normally-closed. Only when backwashing the biological aerated filter, the aeration pipes in the anoxic zone A and the aerobic zone C are started simultaneously to wash pollutants attached on the filler.

As shown in FIG. 1, the gaps 23 between adjacent filler frames 22 and the wall 4 are alternated in each circular corridor of the biological aerated filter 2 for allowing the sewage to fully contact with the filler.

Figure 4:
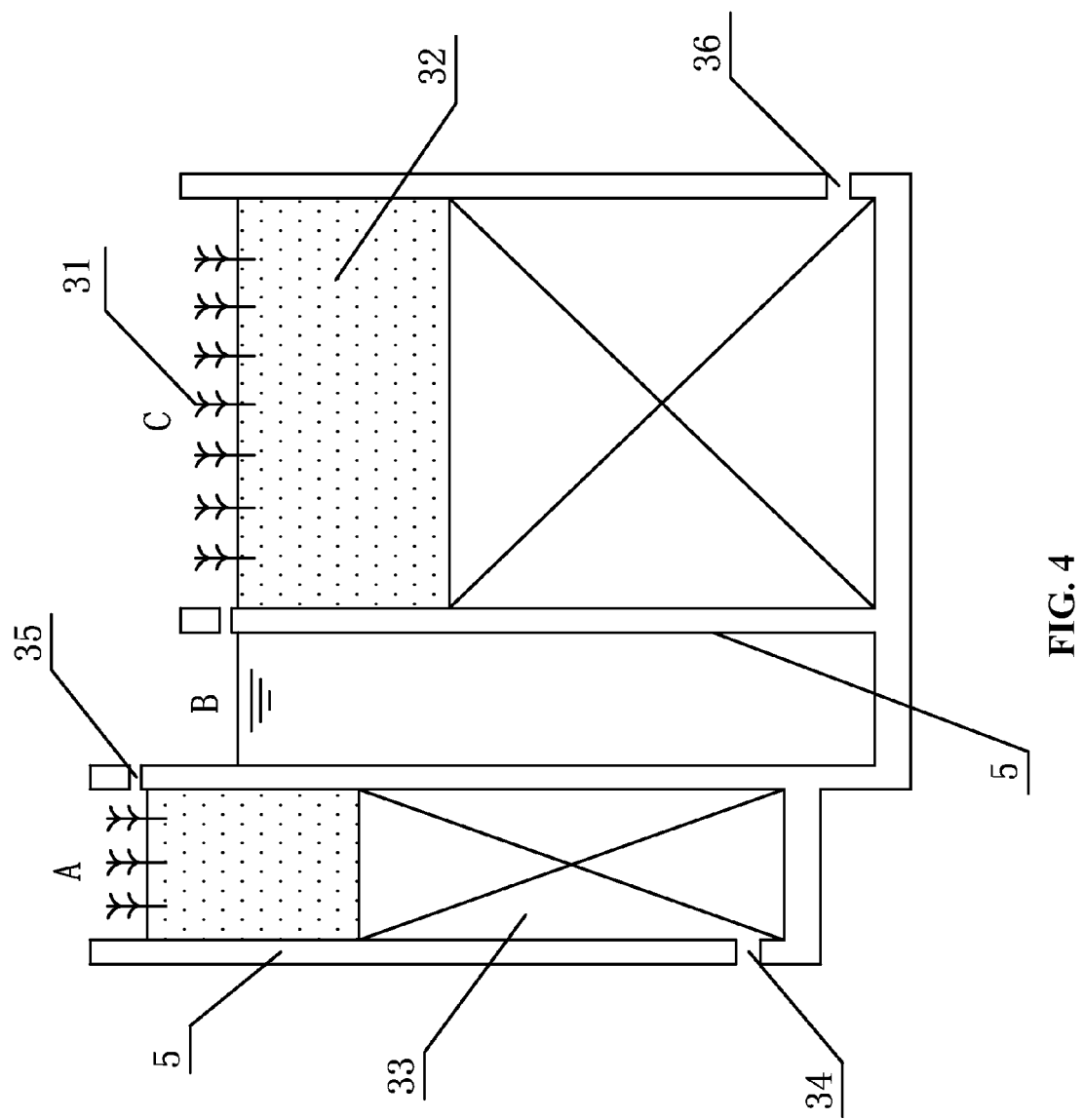
FIG. 4 is a structure of an artificial wetland comprising an anoxic zone A, a natural reoxygenation zone B for drop-aeration, and an aerobic zone C.

As shown in FIG. 4, a plurality of rows of water inlets 34 are arranged on the bottom of the isolation wall 5 of a front end of the first anoxic zone A in the artificial wetland 3, and the water inlets 34 are connected to the water outlet arranged on the bottom of the biological aerated filter 2. The sewage passes through the water inlets 34 arranged on the bottom of the isolation wall 35 of the front end of the first anoxic zone A in the artificial wetland 3, and the second overflows are arranged on each top the isolation wall arranged on two sides of the natural reoxygenation zone B. The sewage passes through the second overflow 35 on the top of the isolation wall 5 of the natural reoxygenation zone B to enter the aerobic zone C. The sewage in the aerobic zone C of the former section enters the anoxic zone A via the water drainage hole 36 arranged on the bottom of the isolation wall 5.

Overburden 32 planted with a plurality of water plants is disposed on an upper part of the anoxic zone A and the aerobic zone C in the artificial wetland 3. A lower part is the filler layer 33 filled with a filler abundant in calcium and iron aluminum. The grain size of the filler varies from larger to smaller along with the flow direction of the swage, therefore, the filler functions in diversion, and is difficult to block, and the effect of sewage treatment can be ensured as long as possible. The natural reoxygenation zone B is disposed between the anoxic zone A and the aerobic zone C, together with the above water plants 31, the concentration of the dissolved oxygen is improved by utilizing the oxygen in the air, and thus, a full content of oxygen is provided for the aerobic zone A, and the nitrification and denitrification processes are well conducted.

A reoxygenation ditch comprising a shallow water layer is arranged on a relatively flat terrain on the natural reoxygenation zone B in the artificial wetland 3. A turbulent thin water layer having a thickness of between 3 and 10 mm is formed by the sewage flow in the ditch, thereby allowing the sewage to fully contact with the air and realizing the purpose of natural reoxygenation. Meanwhile, a drop aeration tank is arranged on a relatively steep terrain on the natural reoxygenation zone B in the artificial wetland 3, and a drop difference of between 1.0 and 1.5 m is disposed between the drop aeration tank and the anoxic zone A of the former section.

The water outlet of the artificial wetland is connected to the water outlet pipe 6, and the sewage is then introduced to a consequent treatment device or directly discharged. To decrease the influence of the water outlet pipe on the overburden 32, a scale height of the water outlet pipe 6 is higher than a scale height of a top of the overburden 32.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A reactor for treating sewage, comprising:
a) an inner layer comprising a water distribution zone;
b) a middle layer comprising a biological aerated filter, the biological aerated filter comprising a wall and a bottom, the bottom of the biological aerated filter comprising a water outlet; and
c) an outer layer comprising an artificial wetland, the artificial wetland comprising a bottom, the bottom of the artificial wetland comprising a water inlet; wherein:
each of the water distribution zone, the biological aerated filter, and the artificial wetland is in a shape of a circle;
the water distribution zone is adapted to receive the sewage via a water inlet pipe; the water distribution zone communicates with the biological aerated filter via a first overflow; the water outlet arranged on the bottom of the biological aerated filter is connected to the water inlet arranged on the bottom of the artificial wetland to allow the biological aerated filter to communicate with the artificial wetland; the water outlet of the artificial wetland is connected to a water outlet pipe;
the biological aerated filter is formed by two layers of circular corridors and is provided with a plurality of filler frames and aerators; the biological aerated filter further comprises a first plurality of sections which are connected to one another, each of the first plurality of sections comprising a first anoxic zone and a first aerobic zone; the plurality of filler frames are arranged with a distance between one another, and a gap is disposed between each of the plurality of filler frames and the wall of the biological aerated filter; and
the artificial wetland further comprises a second plurality of sections which are connected to one another, each of the second plurality of sections comprising a first isolation wall, a second isolation wall, a second anoxic zone, a natural reoxygenation zone, and a second aerobic zone; the first isolation wall is disposed between the second anoxic zone and the natural reoxygenation zone and separates the second anoxic zone from the natural reoxygenation zone; the second isolation wall is disposed between the second aerobic zone and the natural reoxygenation zone and separates the second aerobic zone from the natural reoxygenation zone; a second overflow is disposed on a top of the first isolation wall; a third overflow is disposed on a top of the second isolation wall; the second overflow is higher than the third overflow; and the natural reoxygenation zone is adapted to receive the sewage via the second overflow and to discharge the sewage to the second aerobic zone via the third overflow, wherein the sewage contacts air in the natural reoxygenation zone.

2. The reactor of claim 1, wherein the first aerobic zone of the biological aerated filter is provided with aeration pipes.

3. The reactor of claim 1, wherein the gap between each two of the plurality of filler frames and the wall are alternated in each circular corridor of the biological aerated filter.

4. The reactor of claim 1, wherein a reoxygenation ditch comprising a shallow water layer is arranged on a flat terrain on the natural reoxygenation zone in the artificial wetland.

5. The reactor of claim 1, wherein a drop aeration tank is arranged on a terrain on the natural reoxygenation zone in the artificial wetland.

6. A reactor for sewage treatment, comprising:
a) an inner layer comprising a water distribution zone;
b) a middle layer comprising a biological aerated filter, the biological aerated filter comprising a wall and a bottom, the bottom of the biological aerated filter comprising a water outlet; and
c) an outer layer comprising an artificial wetland, the artificial wetland comprising a bottom, the bottom of the artificial wetland comprising a water inlet; wherein:
each of the water distribution zone, the biological aerated filter, and the artificial wetland is in a shape of a circle;
the water distribution zone is adapted to receive sewage via a water inlet pipe; the water distribution zone communicates with the biological aerated filter via a first overflow; the water outlet arranged on the bottom of the biological aerated filter is connected to the water inlet arranged on the bottom of the artificial wetland to allow the biological aerated filter to communicate with the artificial wetland; the water outlet of the artificial wetland is connected to a water outlet pipe;
the biological aerated filter is formed by two layers of circular corridors and is provided with a plurality of filler frames and aerators; the biological aerated filter further comprises a first plurality of sections which are connected to one another, each of the first plurality of sections comprising a first zone and a second zone; the plurality of filler frames are arranged with a distance between one another, and a gap is disposed between each filler frame and the wall of the biological aerated filter; and
the artificial wetland further comprises a second plurality of sections which are connected to one another, each of the second plurality of sections comprising a first isolation wall, a second isolation wall, a third zone, a fourth zone, and a fifth zone; the first isolation wall is disposed between the third zone and the fourth zone and separates the third zone from the fourth zone; the second isolation wall is disposed between the fourth zone and the fifth zone and separates the fifth zone from the fourth zone; a second overflow is disposed on a top of the first isolation wall; a third overflow is disposed on a top of the second isolation wall; the second overflow is higher than the third overflow; and the fourth zone is adapted to receive the sewage via the second overflow and to discharge the sewage to the fifth zone via the third overflow, wherein the sewage contacts air in the fourth zone.

7. The reactor of claim 6, wherein the second zone of the biological aerated filter is provided with aeration pipes.

8. The reactor of claim 6, wherein the gap between each two of the plurality of filler frames and the wall are alternated in each circular corridor of the biological aerated filter.

9. The reactor of claim 6, wherein a reoxygenation ditch comprising a shallow water layer is arranged on a flat terrain on the fourth zone in the artificial wetland.

10. The reactor of claim 6, wherein a drop aeration tank is arranged on a terrain on the fourth zone in the artificial wetland.

* * * * *